US006707871B1

(12) United States Patent
Thomson

(10) Patent No.: US 6,707,871 B1
(45) Date of Patent: Mar. 16, 2004

(54) NUCLEAR REACTOR

(75) Inventor: Wallace B. Thomson, Severna Park, MD (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 04/171,318

(22) Filed: Feb. 5, 1962

(51) Int. Cl.⁷ .............................................. G21C 23/00
(52) U.S. Cl. ...................................................... 376/318
(58) Field of Search ............... 204/193.2 R, 193.2 RM, 204/193.2 PRP, 193.32; 376/318

(56) References Cited

U.S. PATENT DOCUMENTS

| | | | | |
|---|---|---|---|---|
| 2,920,025 A | * | 1/1960 | Anderson | 204/154.2 R |
| 3,034,976 A | * | 5/1962 | Fortescue et al. | 204/154.2 R |
| 3,070,537 A | * | 12/1962 | Treshow | 204/193.2 RM |

FOREIGN PATENT DOCUMENTS

| | | | | |
|---|---|---|---|---|
| DE | 1095959 | * | 12/1960 | 204/193.2 R |
| FR | 1236953 | * | 6/1960 | 204/193.32 |
| GB | 771111 | * | 3/1957 | 204/154.2 R |

* cited by examiner

*Primary Examiner*—Jack Keith
(74) *Attorney, Agent, or Firm*—John T. Lucas; Paul A. Gottlieb

(57) ABSTRACT

A nuclear reactor comprising a cylindrical pressure vessel, an elongated annular core centrally disposed within and spaced from the pressure vessel, and a plurality of ducts disposed longitudinally of the pressure vessel about the periphery thereof, said core comprising an annular active portion, an annular reflector just inside the active portion, and an annular reflector just outside the active a portion, said annular active portion comprising rectangular slab, porous fuel elements radially disposed around the inner reflector and extending the length of the active portion, wedge-shaped, porous moderator elements disposed adjacent one face of each fuel element and extending the length of the fuel element, the fuel and moderator elements being oriented so that the fuel elements face each other and the moderator elements do likewise, adjacent moderator elements being spaced to provide air inlet channels, and adjacent fuel elements being spaced to provide air outlet channels which communicate with the interior of the peripheral ducts, and means for introducing air into the air inlet channels which passes through the porous moderator elements and porous fuel elements to the outlet channel.

4 Claims, 4 Drawing Sheets

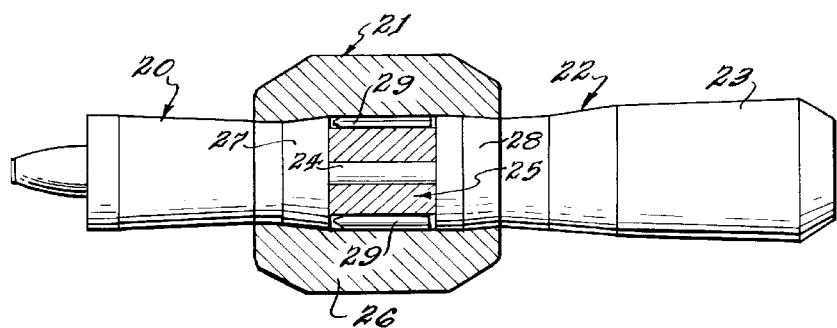
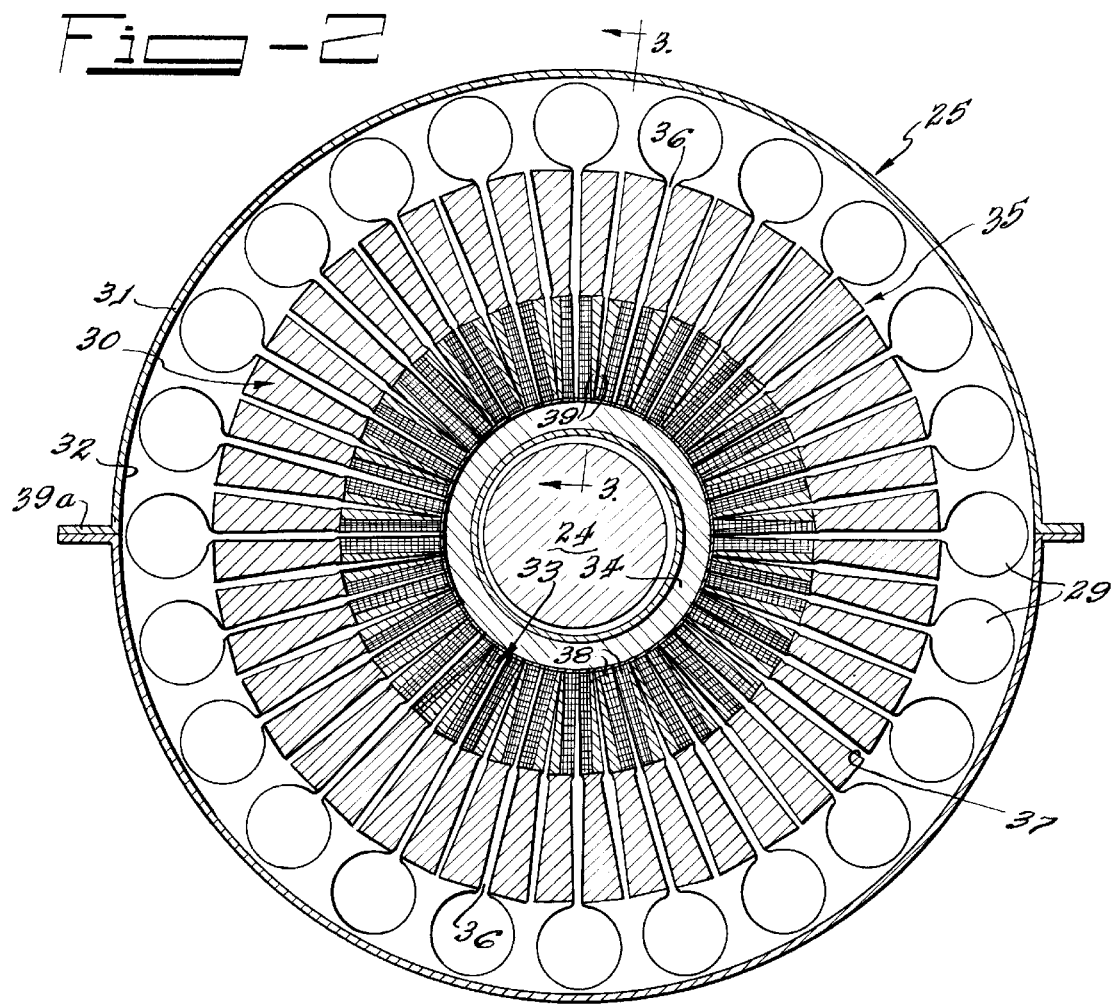

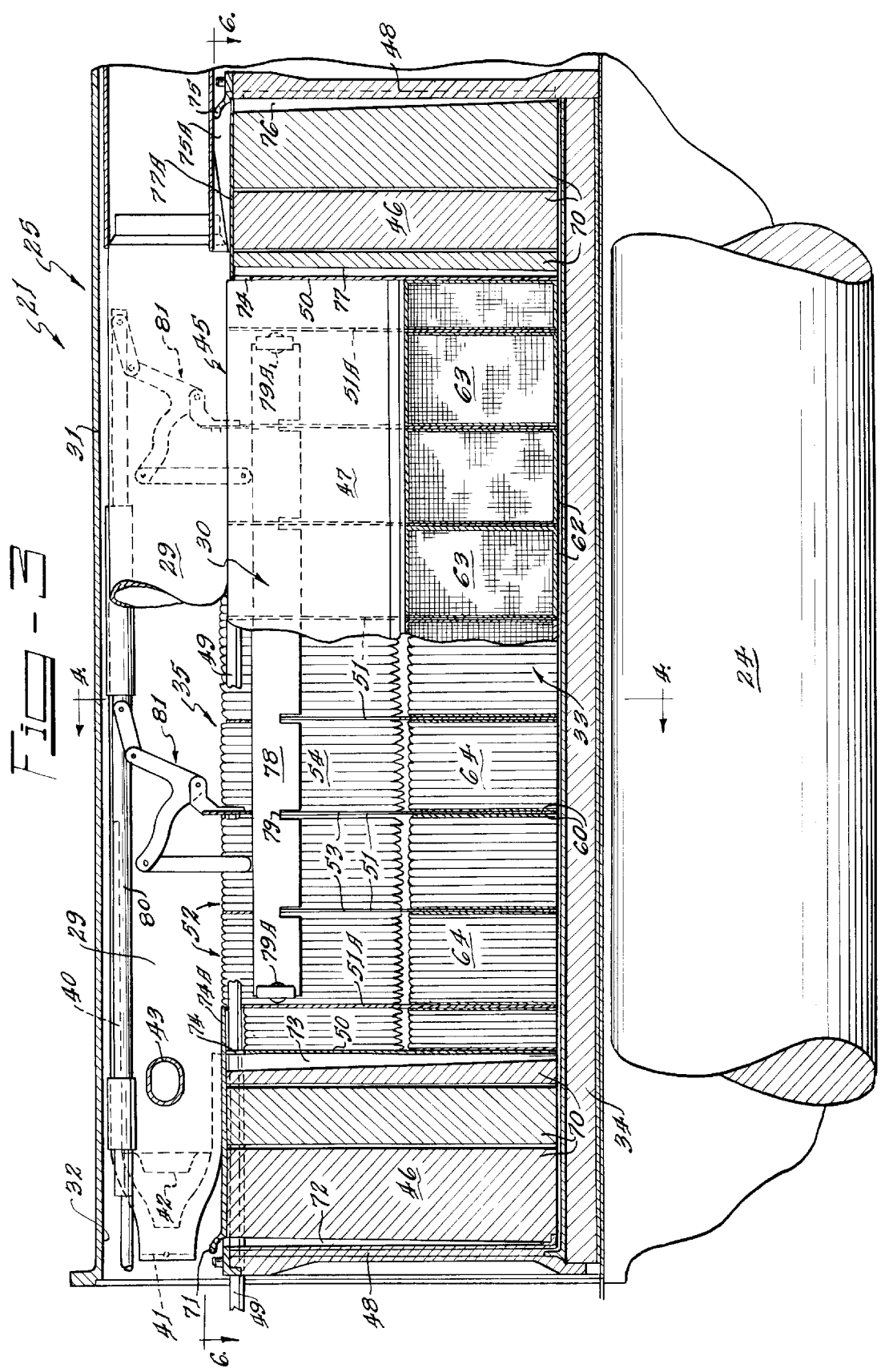

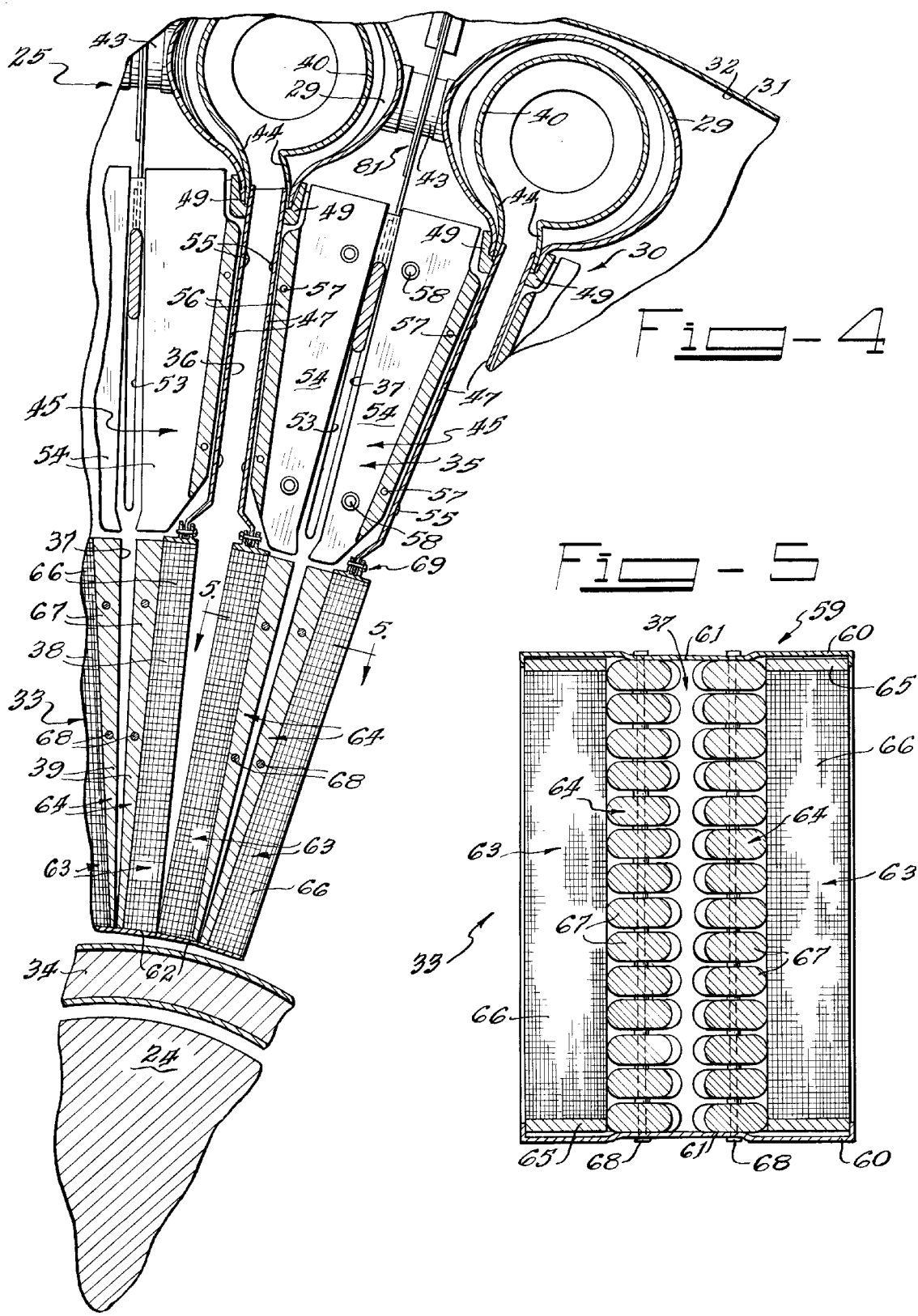

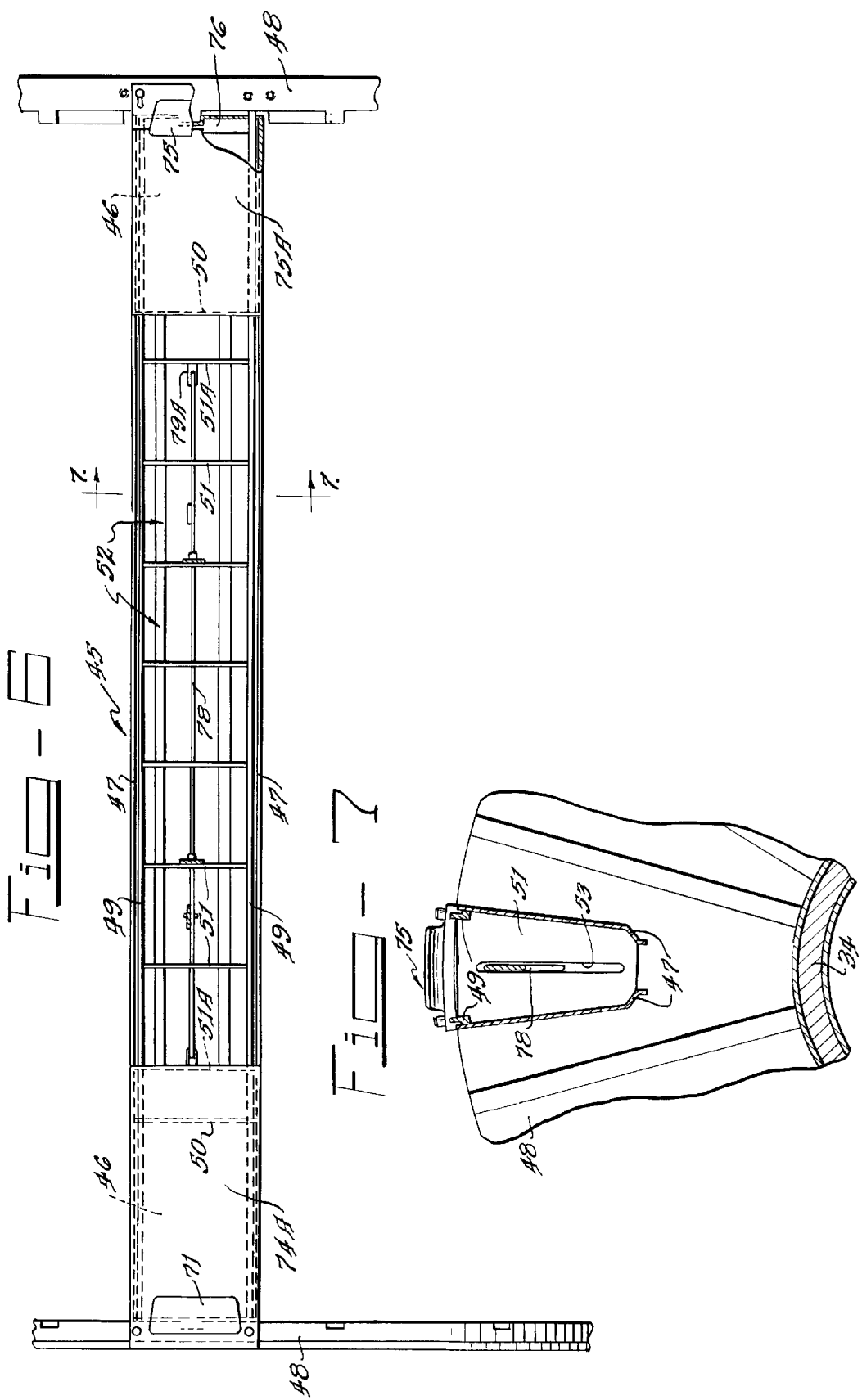

NUCLEAR REACTOR

This invention relates to a nuclear reactor. In more detail the invention relates to a compact, air-cooled reactor useful for power generation. And in still more detail the invention relates to a nuclear reactor designed for aircraft propulsion.

While the reactor according to the present invention will be described particularly in connection with its use as a part of a power plant for aircraft, it will be appreciated that the reactor can be used for other purposes such as in stationary power plants.

The primary objectives of designers of nuclear power plants for aircraft are compactness because of the weight of required shielding and high performance. Because of the high performance requirements for aircraft nuclear reactors, an approach different from that which was successful in the construction of submarine and surface marine vessels is necessary. Two approaches have been followed—a direct-air-cycle system and an indirect-cycle system. The indirect-cycle system employs heat exchangers to transfer heat from a liquid metal to a working fluid. Although the reactor is smaller than a direct-air-cycle system and therefore requires less shielding, the miles of tubing and thousands of welds required make of the reactor an extremely challenging engineering task.

Direct-cycle plants may be subdivided into open-cycle plants or closed-cycle plants. Although the latter offer theoretical advantages, particularly for extremely high-performance power plants, the additional problems created by the necessity for containing the working fluid in closed-cycle plants militate against their immediate utility.

Accordingly the reactor according to the present invention is gas-cooled and is designed to operate in direct, open cycle with a gas turbine.

Such reactors have previously been designed but in general they lack the performance characteristics necessary to make them potentially useful for aircraft propulsion.

It is accordingly an object of the present invention to develop an improved, direct open-cycle reactor using relatively well-known materials under conditions of low temperature and stress and yet achieve compactness and high performance.

It is a further object of the present invention to develop an air-cooled nuclear reactor wherein the distance the air must travel through the core is reduced to a minimum.

It is a further object of the present invention to develop an air-cooled reactor wherein the moderator is overcooled by placing it upstream of the fuel.

It is also an object of the present invention to develop a reactor in which coolant air bathes all possible components.

These and other objects of the invention are attained by a novel direct-cycle nuclear reactor incorporating reversed, folded flow. Folded-flow reactors are defined as reactors in which the frontal area of the fuel elements is so large and the heating path so short that the core must consist of many layers of fuel elements—hence the term "folded". Folded flow compacts the heat exchanger region of the core into a small volume. A reversed-flow, folded-flow reactor is one in which coolant approaches each of the many layers of fuel from a direction parallel to the layers, and after passing through the fuel, returns in the direction from which it came. Flow reversal reduces core size by reducing the air voids necessary to bring air to and from the fuel elements.

To obtain reversed, folded flow a plurality of a rectangular slab porous fuel elements are disposed radially about a central island. Wedge-shaped porous moderator elements are disposed adjacent one face of each fuel element. The layers are oriented in alternate fashion so that the moderator elements face each other and the fuel elements do likewise. These elements are disposed so that coolant air can enter the core travelling inwardly, make a right-angle turn to pass through the moderator layers and then the fuel layers and then make another right-angle turn leaving the core in the reversed direction.

The invention will next be described in connection with the accompanying drawing, wherein FIG. 1 is a schematic view of an aircraft propulsion plant incorporating the nuclear reactor of the present invention, FIG. 2 is a diagrammatic sectional view of the reactor according to the present invention, FIG. 3 is a longitudinal sectional view taken in the direction of the arrows 3—3 in FIG. 2, FIG. 4 is a partial sectional view taken in the direction of the arrows 4—4 in FIG. 3, FIG. 5 is a detail sectional view taken in the direction of the arrows 5—5 in FIG. 4, FIG. 6 is a plan view of the reactor core with the combustion cans removed, taken in the direction of the arrows 6—6 in FIG. 3, and FIG. 7 is a cross-sectional view taken in the direction of the arrows 7—7 in FIG. 6.

Referring first to FIG. 1, the aircraft nuclear propulsion plant includes a compressor section 20, a reactor section 21, a turbine section 22, and ah exhaust nozzle 23. Extending between compressor section 20 and turbine section 22 and passing through the center of reactor section 21 is a shaft 24 coupling the compressor and turbine sections.

Reactor section 21 includes a nuclear reactor 25 surrounded by a shield 26 while shield plugs 27 and 28 are disposed at opposite ends of the reactor. FIG. 1 also shows combustion cans 29 which will be described in more detail hereinafter.

FIG. 2 discloses reactor 25 in somewhat more detail. Reactor 25 comprises an annular core 30 which is enclosed within and spaced from a pressure vessel 31 leaving an annular channel 32 around the periphery of the pressure vessel 31. Twenty-four combustion cans or ducts 29 are disposed in annular channel 32. Reactor core 30 comprises an annular active portion 33, an annular inner reflector 34, an annular outer reflector 35, radial coolant outlet channels 36 and radial coolant inlet channels 37. Active portion 33 includes rectangular fuel zones 38 and wedge-shaped moderator zones 39. It will be noted that coolant outlet channels 36 communicate with the interior of combustion cans 29 while coolant inlet channels 37 communicate with annular channel 32. Pressure vessel 31 is provided with a horizontal flange 39a permitting radial removal of individual fuel segments.

Reactor 25 will now be described in detail by referring to FIGS. 3 and 4. As mentioned previously, combustion cans 29 are located around the periphery of reactor 25 in annular channel 32. Combustion cans 29 have a dual function—they serve as burners for an auxiliary chemical combustion system and as outlet air ducts for the reactor 25. The chemical combustion system will only be described cursorily because it forms no part of the present invention.

Located in combustion cans 29 are inner liners 40 which extend from the inlet end thereof to a point just short of the midpoint of the combustion cans. A valve 41 is located at the inlet end of combustion cans 29 and a swirl cap 42 is located just inside inner liner 40. Cross-fire tubes 43 connect adjacent combustion cans 29. Baffles 44 are employed to direct air from outlet channels 36 into combustion cans 29 with a swirling motion to promote mixing.

Combustion cans 29 are circular in cross section at the inlet end thereof and gradually change to rectangular at the outlet end thereof. The cross-sectional area between cans decreases linearly throughout the length of the core 30 so that the air introduced into the core is at a constant speed and pressure across the length of the core.

The annular volume of the reactor is formed by the radial assembly of 24 identical segments 45, each of which includes a part of end reflectors 46 as well as a part of outer reflector 35 and a part of active portion 33. Segments 45 are defined by side plates 47 and end plates 48. Side plates 47 cover the outer reflector 35 and end reflector 46 but not the active portion 33. L-shaped structural beams 49 are fastened to the top of plates 47 and extend the full length of the segment 45. Beams 49 serve as primary structural support for the reactor core 30, supporting segments 45 from shield plugs 27 and 28. Side plates 47 of adjacent segments 45 are spaced to form outlet channels 36. Dividers 50 separate the end reflectors 46 from the outer reflector 35 and active portion 33. Extending between side plates 47 at spaced intervals between dividers 50 are bulkheads 51 which divide the outer reflector 35 into a plurality of sections 52. The two outermost bulkheads 51A are solid, but the remaining bulkheads 51 have a central radial elongated slot 53 therein (see FIG. 7). The distance between end plates 50 and the outermost bulkheads 51A is only half that between bulkheads 51.

Each section 52 of outer reflector 35 is comprised of a pair of rows of spaced aligned flat slabs 54 of beryllium extending between side plates 47 and fastened thereto by means of bolts 55 passing through flanges 56 on slabs 54. Tie rods 57 extend through flanges 56, while tie rods 58 extend through slabs 54 to hold them securely together. As shown in FIG. 4, the pairs of slabs 54 are separated to form coolant inlet channels 37. There are 13 slabs 54 of beryllium in each row of slabs in full-size sections 52 and only 7 in each of half-size sections at the two ends of the outer reflector 35.

Active portion 33 comprises a plurality of abutting radially arranged sections 59 each having a pair of end plates 60 having a depressed portion 61 at the center thereof (see FIG. 5), a bottom plate 62, a pair of fuel elements 63 and a pair of moderator elements 64. Seven full-size and two one-half-size fuel elements 63 are aligned end to end to form a fuel zone 38 and seven full-size and two one-half size-moderator elements are aligned end to end to form a moderator zone 39. Fuel elements 63 are rectangular in form and include a frame 65 and a plurality of interlaced wires 66 extending across the frame. Wires 66 are formed of a suitable refractory metal or ceramic material such as stainless steel, a "Nichrome" alloy, iron-chromium-yttrium alloys, chromium-titanium alloys, clad graphite, aluminum oxide, and thorium oxide and include a fully enriched uranium dioxide core. "Nichrome" alloys include an alloy consisting of 15–16% chromium, 59–62% nickel, about 24% iron, and 0.1% carbon and an alloy of 80% chromium—20% nickel. Fuel elements 63 are 4"×6"×0.75".

Moderator zone 39 is comprised of moderator elements 64 located on the inner face of each of the fuel elements 63. Moderator elements 64 consist of a row of wedge-shaped, radially-arranged bars 67 of metallic hydride, such as yttrium hydride, or of zirconiumhydride having a $N_H$ of 6, where $N_H$ is defined as the number of hydrogen atoms per cubic centimeter×$10^{-22}$ at room temperature, which are tied together by rods 68 which penetrate depressed portions 61 of end plates 60. Moderator elements 64 are spaced to form coolant inlet channels 37. The cleft running downthrough the moderator forming an extension of inlet passage 37 is for the purpose of minimizing friction in the incoming channel and conducting cool air to the lower end of the moderator pieces to prevent overheating. Active portion 33 is supported from outer reflector 35 by a quick release latch 69.

End reflectors 46 are composed of three pie-shaped slabs 70 of beryllium totalling 8" in thickness. A scoop 71 is located in each segment 45 at the corner of end reflector 46 nearest the inlet end of combustion cans 29. Scoop 71 directs air into a tapering inlet manifold 72 located between front end plate 48 and front end reflector 46. A tapering collecting manifold 73 is located between front end reflector 46 and divider 50 which includes openings 74 about the periphery thereof. A cylindrical cover plate 74A prevents direct communication between channel 32 and end sections 52.

At the aft end of the core another scoop 75 is located on the periphery of rear end plate 48 and serves to direct air from a channel 75A into a tapering inlet manifold 76 located between rear end reflector 46 and rear end plate 48. A tapering collecting manifold 77 is located between rear end reflector 46 and divider 50. Openings 74 are also included in divider 50 and cover plate 77A prevents short circuiting of the coolant air.

The reactor is controlled by control blades 78 which contain notches 79 in the lower edge thereof. Control blades 78 are disposed in coolant inlet channels 37 passing through slots 53 in bulkheads 51. Roller bearings 79A guide blades 78 between solid bulkheads 51A. Control blades 78 are operated by a hydraulic piston actuator (not shown) located just outside the pressure shell, which drives a push rod 80. A linkage 81 converts the axial motion of the blade 78 into a 4½" radial stroke within reflector 35, the notches 79 corresponding to the location of bulkheads 51. A spring (not shown) serves to hold the blades inserted when the actuator is removed and causes the system to be fail-safe in the event of actuator failure.

To make the fueled Nichrome wire, a tube of "Nichrome" 9.5" long, 0.70" in diameter and about 0.160" wall thickness is obtained. A blend of 70% "Nichrome" and 30% $UO_2$ powder, for example, is green-pressed, sintered and coined to 93% theoretical density. The compacts are then assembled into the tube with the ends of the tube capped with NiCr plugs.

The compacts contained in the tube are subjected to 10 tons pressure to secure the compacts in place. After a diffusion treatment of two hours at 2100° F. in a hydrogen atmosphere, the ends are welded closed. At this point the tube is rod-rolled (hot) to a diameter of 0.275". It is then cold-drawn by successive steps to the desired diameter of 35 mils. The coils of wire are annealed prior to every drawing operation. With a target of 4 mils for the clad thickness, the usual results range from 3–7 mils. The bond between the clad and the fueled core is generally sound.

To fabricate the fuel elements the finished fueled wire is straightened to remove curl. Then 60 to 80 wires about five feet long each are stretched in a grooved metal plate so they are in a plane parallel to each other and precisely 25 mils apart. The wires are then heavily coated with an epoxy resin containing a small amount of braze powder. When the resin has hardened, the wires plus the resin form a strip which is then cut into squares corresponding to the size of the fuel element desired. The cut strips are then stacked in a crisscross fashion to the desired fuel element thickness, usually about ¾". Alignment is made positive by placing the stack in a jig which prevents the wires from moving during subsequent operations. Then the stacked wires, together with the jig, are inserted in a brazing furnace under a moderate clamping pressure. As the temperature rises to several hundred degrees F., the resin melts and runs off, leaving most of the braze material behind on the wires. As the brazing temperature of 2150° F. is reached, the joints where the wires cross each other are brazed together. It has been found that some joints are not brazed, but this does not significantly weaken the brazed lock since the fraction of missed joints is low.

The zirconium hydride bars are made by surrounding a zirconium bar with a hydrogen atmosphere, at an elevated temperature, allowing the system to come to equilibrium, and then cooling under controlled temperature-pressure relationship as described in patent application Ser. No. 785,542 filed Jan. 7, 1959 on behalf of James B. Vetrano.

In operation, air discharged from compressor section 20 flows straight aft through annular passage 32 and is distributed radially inward along the full length of the reactor. The flow enters coolant inlet channels 37, passes first through reflector slabs 54, then enters active portion 33 and turns laterally to flow first through moderator elements 64 and then through fuel elements 63 and is then discharged outward radially through coolant channels 36 into the side of chemical combustion cans 29. The flow then proceeds aft through the turbine and exhaust nozzle of the power plant.

A small portion of the air from the compressor is picked up by scoops 71 and 75 respectively which direct it into manifolds 72 and 76 respectively. The air cools end reflectors 46 by passing through perforations (not shown) therein and is collected in manifolds 73 and 77. From manifolds 73 and 77 the air proceeds through openings 74 to make a right-angle turn and enter inlet channels 37 in half-size sections 52. In half-size sections 52 the air travels the same path as in the remainder of the core. Thus the air employed to cool the end reflectors serves a dual function as it also cools a half-size fuel element.

The high performance of this reactor results from the effectiveness of the heat transfer. The very energetic heat transfer that takes place between the fuel element wires and the air is caused by the large heat transfer coefficient together with the large surface area of the wires. The heat transfer coefficient is known to be 267 B/hr. ft.$^{2\circ}$ F. at cruise and 450 at emergency power. The magnitude of the coefficient is attributable to the interrupted path and turbulence of the air. The fuel element contains 630 square feet of surface area for every cubic foot of matrix, yielding a total heat transfer area of 2520 square feet. The total frontal area of the fuel elements, 64 square feet, is so great that the air trickles through them at a mean velocity of about 50 feet per second.

One of the best features of this reactor is the nearly isothermal condition achieved in the wires because of the steep nuclear power gradient existing through the ¾-inch thickness of the fuel element. This occurs because the fission-producing neutrons emanating from the moderator impinge with full intensity upon the front wires but fall off to about one-fifth of the intensity by the time that they reach the rear wires. This attenuation is caused by their passage through the fuel. The result is that all wires are worked at nearly their full heat transfer capacity, the front wires running at 1417° F. and the rear wires at 1968° F. while producing air at 1850° F.

The compactness of the reactor results from use of the reversed folded-flow principle. Folded flow alone reduces the core volume by only about 10% over that of a straight-through reactor. Folded flow combined with flow reversal reduces the core volume by 50%, because the distance any given air element must travel through the core is reduced to a minimum. This reduction in core volume is highly desirable, of course, because of the concomitant reduction in the amount of shielding required.

One advantage of the structure described arises from the relative location of the moderator and the fissionable material. It will be noted that the entire air flow passes through the moderator before it passes through the fuel. Thus, the moderator is bathed in relatively cool air which holds the temperature of the moderator down. Thus, even though the temperature of the fuel is relatively high, the temperature of the moderator is relatively low. This is important because unclad zirconium hydride cannot be employed at a temperature much above 1200° F.

Another advantage is that virtually all components of the reactor are bathed in cool inlet air. The relatively cool inlet air from the compressor is directed over the outer reflector, the end reflector, the moderator, and part of the core structure. In addition the location of the control blades is such that they are bathed in cool inlet air. Also a small proportion of the air from the compressor is directed over the inner reflector by means not shown.

SUMMARY OF POWER PLANT DATA

TABLE 1

| Dimensions | |
| --- | --- |
| Core diameter | 28 in. |
| Core length | 33 in. |
| Shaft O. D. | 11 in. |
| Reactor-Shield Assembly length | 115 in. |
| Reactor-Shield Assembly diameter | 101 in. |
| Reflector O. D. | 43.6 in. |
| Pressure shell O. D. | 54 in. |
| Wire diameter | 35 mils |
| Wire spacing | 25 mils |
| Fuel bed thickness | .75 in. |
| Moderator thickness | .25 in. |
| Moderator air gap | 33 mils |

TABLE 2

| Core Volume Fractions | |
| --- | --- |
| Moderator (ZrH$_x$) | .223 |
| Fueled wire (NiCr—UO$_2$) | .237 |
| Structure (Hastelloy X) | .029 |
| Air void | .511 |
| Total | 1.000 |

TABLE 3

| Basic Materials | |
| --- | --- |
| Fuel Element | NiCr—UO$_2$ |
| Moderator | ZrH$_x$, unclad, N$_H$ = 6 |
| Reflector | Be |
| Core Structure | "Hastelloy X" |
| Shielding | Be—B |
| | LiH |
| | Stainless steel |
| | "Inconel X" |

TABLE 4

| Temperatures | |
| --- | --- |
| Compressor exit air | 672° F. |
| Core inlet air | 700° F. |
| Fuel element inlet air | 750° F. |
| Fuel element exit air | 1850° F. |

TABLE 4-continued

| Temperatures | |
| --- | --- |
| Turbine inlet | 1800° F. |
| Jacket reflector | 1000° F. |
| Moderator | 1000° F. |
| Fueled wire, inlet | 1417° F. |
| Fueled wire, exit, avg. | 1968° F. |

It will be understood that the invention is not to be limited by the details given herein but that it may be modified within the scope of the appended claims.

What is claimed is:

1. A nuclear reactor comprising a cylindrical pressure vessel, an elongated annular core centrally disposed within and spaced from the pressure vessel, and a plurality of ducts disposed longitudinally of the pressure vessel about the periphery thereof, said core comprising an annular active portion, an annular reflector just inside the active portion and an annular reflector just outside the active portion, said annular active portion comprising rectangular slab, porous fuel elements radially disposed around the inner reflector and extending the length of the active portion, wedge-shaped, porous moderator elements disposed adjacent one face of each fuel element and extending the length of the fuel element, the fuel and moderator elements being oriented so that the fuel elements face each other and the moderator elements do likewise, adjacent moderator elements being spaced to provide air inlet channels, and adjacent fuel elements being spaced to provide air outlet channels which communicate with the interior of the peripheral ducts, and means for introducing air into the air inlet channels which passes through the porous moderator elements and porous fuel elements to the outlet channel.

2. A nuclear reactor according to claim 1 wherein said fuel elements comprise interlaced wires of an alloy consisting of 15–16% chromium, 59–62% nickel, about 24% iron, and 0.1% carbon containing uranium dioxide at the center thereof extending between side plates, and said moderator elements comprise a row of spaced wedge-shaped, radially-disposed bars of zirconium hydride.

3. A nuclear reactor comprising a cylindrical pressure vessel, an elongated annular core disposed in said pressure vessel, and a plurality of ducts disposed longitudinally of the pressure vessel in an annular channel about the periphery thereof, said core comprising an annular active portion, an annular inner reflector, an annular outer reflector, and a pair of porous end reflectors, said outer reflector, active portion and end reflectors being formed of the radial assembly of a plurality of identical segments, each of said segments comprising a pair of side plates covering the outer reflector and inner reflector but not the active portion, side plates of adjacent segments being spaced to provide air outlet channels, said air outlet channels communicating with the peripheral ducts, said active portion being divided into sections, each section containing two radial porous fuel elements, and two porous moderator elements disposed adjacent the inner faces of the fuel elements, said active portion depending from the above-mentioned side plates, dividers separating the outer reflector from the end reflectors, bulkheads extending between the side plates between the dividers, all of said bulkheads except the two at the ends of the outer reflector containing an elongated radial slot, control blades mounted for radial movement in the said slots within the outer reflector, and means for introducing air to the above-mentioned annular channel.

4. A nuclear reactor according to claim 3 wherein the two sections at the ends of the segment are shorter than the remaining segments, and including air scoops designed to direct a portion of the air traversing the annular channel to the end reflectors, and means establishing channels directing the air after its passage through the end reflectors to the short end sections.

* * * * *